Figures 1, 2:
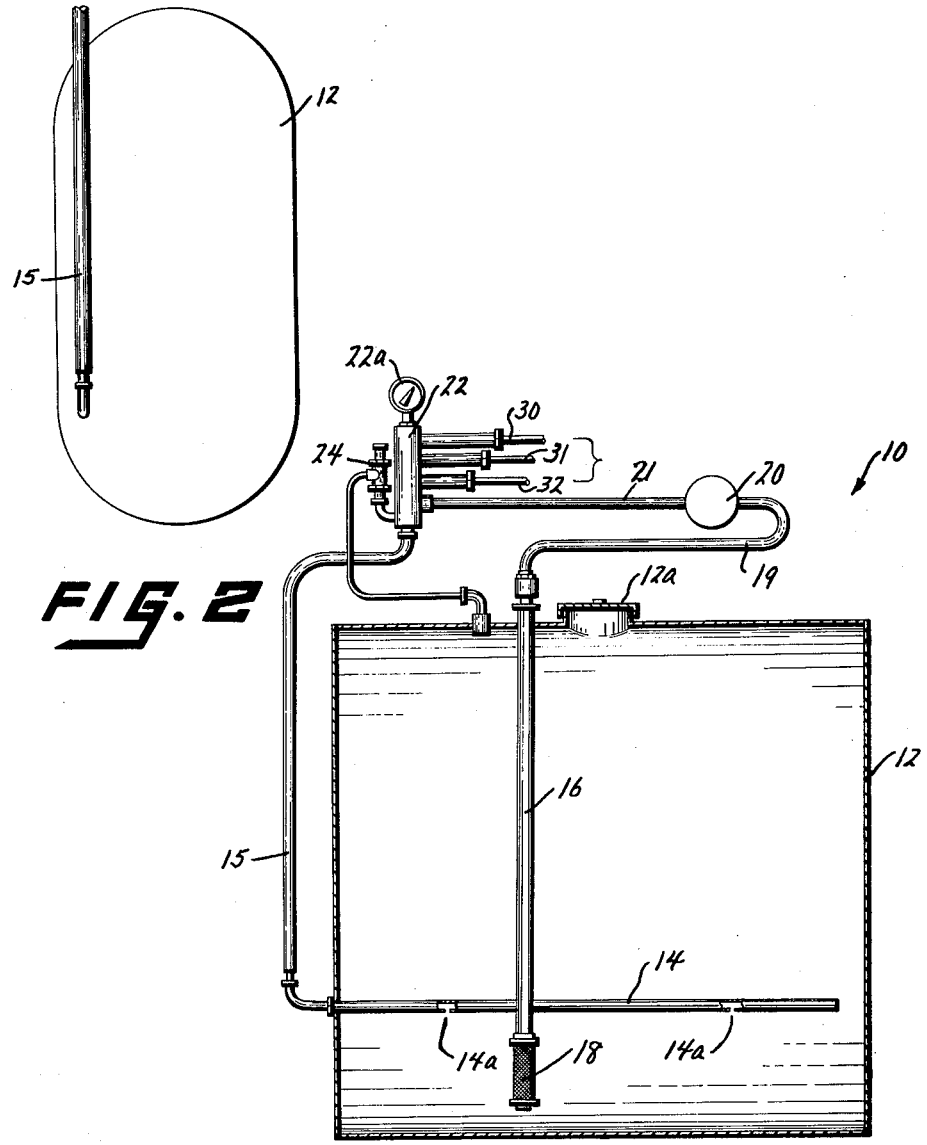

Feb. 8, 1966 G. E. BETULIUS 3,233,874
JET AGITATOR
Filed Oct. 21, 1963

INVENTOR.
GILBERT E. BETULIUS
BY
Attorney

United States Patent Office 3,233,874
Patented Feb. 8, 1966

3,233,874
JET AGITATOR
Gilbert E. Betulius, Vanderburgh County, Ind., assignor to Hahn, Inc., Evansville, Ind., a corporation of Indiana
Filed Oct. 21, 1963, Ser. No. 317,990
2 Claims. (Cl. 259—95)

The present invention relates to the mixing of chemicals, and more particularly to the hydraulic mixing of farm chemicals to assure the uniform application thereof during use.

As is known, it is desirable to spray and treat fields prior to planting and growing crops, as well, for various purposes, including, for example, to promote growth by fertilizing and to eliminate insects or the like by the use of insecticides. In this connection, the farm chemicals generally employed for the aforesaid purposes are received in solid form and, thereafter, mixed as desired. Obviously, it is important that these chemicals are thoroughly mixed to assure the uniform application thereof and, of course, the best benefits.

Prior approaches to the mixing of farm chemicals included, by way of example, a tedious hand operation or, in any event, arrangements whereby the mixed chemical would tend to separate, supplying, therefore, a non-uniform mixture, sometimes to the extent of even clogging the apparatus from which it was dispensed.

By virtue of the instant invention, the applicant herein has provided a hydraulic jet tank agitator for farm chemicals where the latter are thoroughly mixed to assure uniform application. The aforesaid hydraulic jet action is achieved through the new and novel placement of the supply conduit within a specially designed tank whereby a continual mixing effect is created during operation of the apparatus.

Accordingly, the principal object of the present invention is to provide a new and novel apparatus for mixing farm chemicals.

Another object of the present invention is to provide a new and novel hydraulic jet tank agitator for thoroughly mixing farm chemicals to assure their uniform application.

A further and more general object of the present invention is to provide apparatus for the thorough mixing of chemicals at the time of application, and one which is readily manufactured, simple to use, and highly effective in end results.

Other objects and a better understanding of the present invention will become more apparent from the following description, taken in conjunction with the drawing, wherein FIG. 1 is a view in side elevation showing the applicant's new and novel jet tank agitator, where a portion of the side wall thereof is in vertical section for reasons of clarity; and FIG. 2 is an end view of the jet tank agitator of FIG. 1.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the applicant's new and novel jet tank agitator 10 typically comprises a tank 12 which, in a preferred embodiment of the invention, has generally parallel side and end walls, where the side walls blend into curved top and bottom portions having a semicircular shape. The tank 12 further includes a loosely fitting cap 12a through which the dry chemical is introduced.

Extending into the tank 12 and, importantly, at a point defined as proximate the point of juncture between a side wall and the curved bottom portion thereof is a conduit 14 through which the mixed chemical flows for continual further mixing. As should be apparent from FIG. 1, conduit 14 has one or more openings 14a therein from which the mixed chemical flows, the number of such openings 14a depending, in part, upon the size of the pump employed, where for maximum operation, such openings 14a are in a downward direction, or slightly (in the matter of one to five degrees) in the direction of the nearest adjacent side wall.

Also extending into the tank 12, but, typically, from the top thereof is a suction conduit 16 having a conventional strainer 18 disposed at the lower end thereof. The suction conduit 16 connects to a common motor-driven pump 20 through a conduit 19, where the other side of said pump connects, through a conduit 21, to a manifold 22 having a pressure gauge 22a thereon. A pressure relief valve 24 interconnects the manifold 22 and the top of the tank 12 so that if a desired pressure is exceeded, the mixed chemical passes into the tank 12 in a conventional manner.

Inasmuch as the instant jet tank agitator 10 is preferably used on a high-clearance sprayer, where the mixed chemical is sprayed onto successive rows of crop through spray nozzles disposed on a boom (not shown), conduits 30, 31 and 32 interconnect the manifold 22 and such spray nozzles. Additionally, a conduit 15 interconnects the manifold 22 and the conduit 14.

In use, the entry cap 12a is removed and the dry chemical introduced into the tank 12 together with the desired liquid. The motor-driven pump 20 is then energized, and the apparatus is cycled for a short period, during which time the mixed chemical is not permitted to pass from the spray nozzles. In any event, the desired mixing effect is being achieved, in that the jet streams of mixed chemical are creating flow patterns within the tank 12, resulting in continual mixing and a uniform grade of chemical for crop application. It should be apparent from the drawing of the system that safety is inherent with the instant invention, in that the pressure relief valve 24 regulates and controls internal pressure for all operative components.

Thereafter, the conduits 30, 31 and 32 which interconnect the manifold 22 and the spray nozzles are opened through common valve means (not shown), permitting application of the uniformly mixed chemical. Operation continues with use of the motor-driven pump 20, until a new supply of dry chemical and liquid is required.

It should be understood that the applicant herein has provided a new and novel jet agitator which creates important current flow within a specially designed tank, where such current flow is created through the important placement of the supply conduit within the tank. In other words, the desirable current flow causes effective intermixing between a liquid and the dry chemical in simulated jet streams, providing a convenience and uniformity of chemical control which has not been possible with previous devices.

The jet agitator described herebefore is susceptible to various changes within the spirit of the invention. For example, alternative valving means may be employed, and the tank may assume different physical proportions. Thus, the preceding description should be considered illustrative and not as limiting the scope of the following claims.

I claim:

1. A jet tank agitator for mixing chemical and liquid comprising a storage tank having side and end walls and semi-circular top and bottom portions respectively connecting said side walls, an inlet conduit extending into said tank in a line proximate the juncture of one of said side walls and said bottom portion, said inlet conduit having at least one fluid port therein directed downwardly parallel to said one of said side walls to provide unidirectional fluid flow within said tank beginning at the upper region of said bottom portion, an outlet conduit communicating with said tank for discharging mixed chemical and liquid, and pump means in a chemical and liquid path including said inlet conduit, said tank, and said outlet conduit.

2. The jet tank agitator of claim 1 where said at least one fluid port is directed downwardly out of a plane parallel to said one of said side walls but slightly towards the juncture of said one of said side walls and said bottom portion.

References Cited by the Examiner
UNITED STATES PATENTS

| | | | |
|---|---|---|---|
| 1,706,418 | 3/1929 | Sissom | 259—95 |
| 2,462,034 | 2/1949 | Zeck | 259—95 |
| 2,661,668 | 12/1953 | Gruen | 259—95 |
| 2,692,798 | 10/1954 | Hicks | 259—95 |

WALTER A. SCHEEL, *Primary Examiner.*

CHARLES A. WILLMUTH, *Examiner.*